(12) United States Patent
Zhao et al.

(10) Patent No.: US 9,513,463 B2
(45) Date of Patent: Dec. 6, 2016

(54) PHOTOGRAPHIC LENS AND ELECTRONIC APPARATUS

(71) Applicant: SAMSUNG ELECTRONICS CO., LTD., Suwon-si, Gyeonggi-do (KR)

(72) Inventors: Liefeng Zhao, Suwon-si (KR); Sung-wook Choi, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/579,273

(22) Filed: Dec. 22, 2014

(65) Prior Publication Data

US 2015/0219877 A1   Aug. 6, 2015

(30) Foreign Application Priority Data

Feb. 5, 2014   (KR) .................. 10-2014-0013192

(51) Int. Cl.
| | | |
|---|---|---|
| *G02B 13/18* | (2006.01) | |
| *G02B 3/02* | (2006.01) | |
| *G02B 9/34* | (2006.01) | |
| *G02B 13/00* | (2006.01) | |
| *H04N 5/225* | (2006.01) | |
| *G02B 5/00* | (2006.01) | |
| *G02B 1/04* | (2006.01) | |

(52) U.S. Cl.
CPC ............. *G02B 13/004* (2013.01); *G02B 9/34* (2013.01); *H04N 5/2254* (2013.01); *G02B 1/041* (2013.01); *G02B 5/005* (2013.01); *G02B 13/002* (2013.01); *G02B 13/0015* (2013.01); *G02B 13/18* (2013.01)

(58) Field of Classification Search
CPC .......... G02B 13/004; G02B 9/34; G02B 13/18; G02B 13/0015; G02B 5/005; G02B 13/002; G02B 1/041
USPC ................... 359/715, 739, 740, 747, 773
See application file for complete search history.

(56) References Cited

U.S. PATENT DOCUMENTS

| | | | |
|---|---|---|---|
| 7,907,353 B2 | 3/2011 | Onoda | |
| 8,004,777 B2 | 8/2011 | Sano et al. | |
| 8,395,691 B2 | 3/2013 | Tang et al. | |
| 8,400,553 B2 | 3/2013 | Yamashita et al. | |
| 8,503,112 B2 | 8/2013 | Hsu et al. | |
| 8,520,321 B2 | 8/2013 | Takei | |
| 2007/0242370 A1* | 10/2007 | Fukuta ................ | G02B 9/34 359/773 |
| 2009/0207507 A1* | 8/2009 | Shinohara ............ | G02B 9/34 359/773 |
| 2009/0257133 A1* | 10/2009 | Sano ................... | G02B 9/34 359/715 |
| 2010/0060996 A1* | 3/2010 | Ozaki ................. | G02B 13/004 359/715 |
| 2010/0309367 A1* | 12/2010 | Iba .................... | G02B 9/34 359/715 |

(Continued)

*Primary Examiner* — Evelyn A Lester
(74) *Attorney, Agent, or Firm* — Drinker Biddle & Reath LLP

(57) ABSTRACT

Provided are a photographic lens and an electronic apparatus including the photographic lens. The photographic lens includes a first lens that has a positive refractive power and includes a biconvex lens, a second lens that has a negative refractive power, a third lens that has a positive refractive power, and a fourth lens that has a negative refractive power. The first, second, third, and fourth lenses are arranged sequentially from an object-side to an image-side.

22 Claims, 11 Drawing Sheets

(56) References Cited

U.S. PATENT DOCUMENTS

| | | | | |
|---|---|---|---|---|
| 2011/0249171 A1* | 10/2011 | Shigemitsu | ........... | G02B 13/004 359/715 |
| 2012/0019706 A1* | 1/2012 | Yamashita | ............... | G02B 9/34 359/715 |
| 2012/0044583 A1* | 2/2012 | Ise | ...................... | G02B 13/004 359/715 |
| 2012/0069239 A1* | 3/2012 | Ohki | .................... | G02B 13/004 359/773 |
| 2012/0194925 A1* | 8/2012 | Teraoka | ............... | G02B 13/004 359/773 |
| 2012/0200944 A1* | 8/2012 | Teraoka | ............... | G02B 13/004 359/773 |
| 2013/0335588 A1* | 12/2013 | Matsusaka | ............... | G02B 3/00 359/773 |

* cited by examiner

PHOTOGRAPHIC LENS AND ELECTRONIC APPARATUS

CROSS-REFERENCE OF RELATED PATENT APPLICATIONS

This application claims the priority benefit of Korean Patent Application No. 10-2014-0013192, filed on Feb. 5, 2014, in the Korean Intellectual Property Office, the disclosure of which is incorporated herein in its entirety by reference.

BACKGROUND

1. Field

One or more embodiments of the invention relate to a small and wide-angle photographic lens, and an electronic apparatus including the same.

2. Description of the Related Art

Many users use a photographing apparatus that uses a solid-state imaging device such as a Charge-Coupled Device (CCD)-type image sensor or a Complementary Metal-Oxide Semiconductor (CMOS)-type image sensor. The photographing apparatus includes a digital still camera, a video camera, an interchangeable lens camera, or the like. Since the photographing apparatus using the solid-state imaging device may be small, the photographing apparatus has recently been applied to a small information terminal such as a mobile phone, etc. Users demand that the photographing apparatus has high performance features such as high resolution, a wide angle, etc. Also, many users have become highly proficient in using the photographing apparatus.

In this regard, since the imaging device has a smaller size and more pixels, it is required for a photographic lens to have high resolution and high performance. However, it is difficult for four or five photographic lenses to realize user-desired high specifications and it is also difficult for the four or five photographic lenses to be mounted on a slim and portable terminal and simultaneously satisfy optical and aberration characteristics.

SUMMARY

One or more embodiments include a small and wide-angle photographic lens.

One or more embodiments include an electronic apparatus including the small and wide-angle photographic lens.

Additional aspects will be set forth in part in the description which follows and, in part, will become apparent from the description, or may be learned by practice of the presented embodiments.

According to one or more embodiments, a photographic lens includes a first lens that has a positive refractive power and includes a biconvex lens; a second lens that has a negative refractive power; a third lens that has a positive refractive power; a fourth lens that has a negative refractive power; and an image sensor. The first, second, third, and fourth lenses are arranged sequentially from an object-side to an image-side, and the photographic lens satisfies the following conditions:

$$-3 < RS6/RS8 < -1.3,$$

$$0.85 < IMH/EFL < 1.5,$$

where, RS6 is a radius of curvature of an image-side surface of the third lens, RS8 is a radius of curvature of an image-side surface of the fourth lens, IMH indicates a height of the image sensor, and EFL is an effective focal length of the photographic lens.

The photographic lens may further satisfy the following condition:

$$|RS5|/|RS6| > 2,$$

where RS5 is a radius of curvature of an object-side surface of the third lens.

The photographic lens may further satisfy the following condition:

$$1 < BFL/TL4 < 2.5,$$

where BFL is a back focal length of the photographic lens and TL4 is a thickness of the fourth lens.

The photographic lens may further satisfy the following condition:

$$0 < (TA2+TA3)/(TL3+TL4) < 0.3,$$

where, TA2 is an air gap between the second lens and the third lens, TA3 is an air gap between the third lens and the fourth lens, TL3 indicates a thickness of the third lens, and TL4 indicates a thickness of the fourth lens.

According to one or more embodiments, a photographic lens includes a first lens having a positive refractive power; a second lens having a negative refractive power; a third lens having a positive refractive power; and a fourth lens having a negative refractive power. The first, second, third, and fourth lenses are arranged sequentially from an object-side to an image-side, and the photographic lens satisfies the following conditions:

$$|RS5|/|RS6| > 2,$$

$$1 < BFL/TL4 < 2.5,$$

$$0 < (TA2+TA3)/(TL3+TL4) < 0.3,$$

where, RS5 is a radius of curvature of an object-side surface of the third lens, RS6 is a radius of curvature of an image-side surface of the third lens, BFL is a back focal length of the photographic lens, TA2 is an air gap between the second lens and the third lens, TA3 is an air gap between the third lens and the fourth lens, TL3 indicates a thickness of the third lens, and TL4 indicates a thickness of the fourth lens.

An aperture stop may be further arranged at an object-side surface of the first lens.

Each of the first through fourth lenses may have at least one aspherical surface.

Each of the first through fourth lenses may have two aspherical surfaces.

The second lens may have at least one concave surface.

Each of the first through fourth lenses may be a plastic lens.

The image-side surface of the fourth lens may have at least one inflection point.

An object-side surface of the fourth lens may have at least one inflection point.

The second lens may be a meniscus lens having a concave surface toward the object-side, a biconcave lens, or a meniscus lens having a concave surface toward the image-side.

The photographic lens may further satisfy the following condition:

$$0.5 < FL1/EFL < 1,$$

where FL1 is a focal length of the first lens and EFL is an effective focal length of the photographic lens.

The photographic lens may further satisfy the following condition:

$$-0.1 < EFL/FL12 < 1,$$

where EFL is an effective focal length of the photographic lens and FL12 indicates an effective focal length of the first lens and the second lens.

The photographic lens may further satisfy the following condition:

$$25 < V1-V2,$$

where V1 is an Abbe number of the first lens and V2 is an Abbe number of the second lens.

The photographic lens may satisfy the following condition:

$$RS7 > RS8 > 0,$$

where RS7 is a radius of curvature of an object-side surface of the fourth lens and RS8 is a radius of curvature of the image-side surface of the fourth lens.

The photographic lens may have an angle of view equal to or greater than 80 degrees.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments of a photographic lens and an electronic apparatus including the photographic lens, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Figure 1:
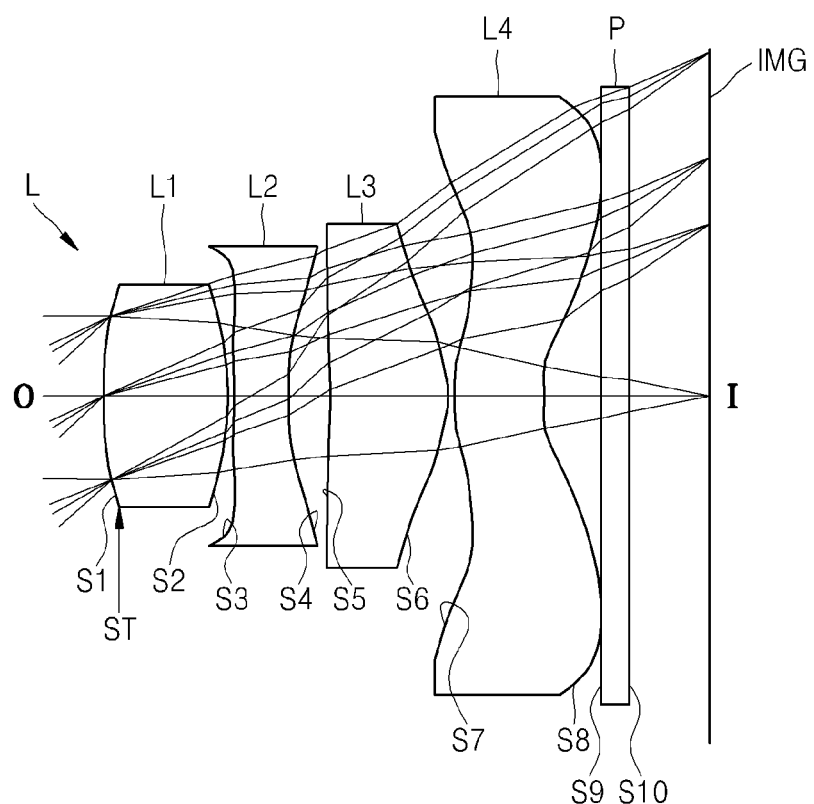
FIG. 1 illustrates a photographic lens, according to a first embodiment.

FIG. 1 illustrates a photographic lens L, according to an embodiment.

The photographic lens L may include a first lens L1 having a positive refractive power, a second lens L2 having a negative refractive power, a third lens L3 having a positive refractive power, and a fourth lens L4 having a negative refractive power, which are arranged sequentially from an object-side O to an image-side I.

An aperture stop ST may be arranged between an object side of the first lens L1 and the second lens L2. For example, the aperture stop ST may be arranged at an object-side surface S1 of the first lens L1.

The first lens L1 may be a biconvex lens. The second lens L2 may have at least one concave surface. For example, the second lens L2 may have an object-side surface S3 that is concave toward the object-side O or may have an image-side surface S4 that is concave toward the image-side I. The second lens L2 may be a meniscus lens having a concave surface toward the object-side O or a meniscus lens having a concave surface toward the image-side I. Alternatively, the second lens L2 may be a biconcave lens.

The third lens L3 may have an image-side surface S6 that is convex toward the image-side I. The third lens L3 may have an object-side surface S5 that is convex or concave toward the object-side O. The third lens L3 may be a meniscus lens having a concave surface toward the object-side O or may be a biconvex lens. An image-side surface S8 of the fourth lens L4 may have at least one inflection point. An object-side surface S7 of the fourth lens L4 may have at least one inflection point. Here, the inflection point indicates a point at which a sign of a radius of curvature is changed from a positive (+) value to a negative (−) value or from a negative (−) value to a positive (+) value. Alternatively, the inflection point indicates a point on a lens surface at which a concave shape is changed to a convex shape or a convex shape is changed to a concave shape. The object-side surface S7 of the fourth lens L4 may be convex near an optical axis and may be concave as the object-side surface S7 is farther away from the optical axis. The image-side surface S8 of the fourth lens L4 may be concave near the optical axis and may be convex as the image-side surface S8 is farther away from the optical axis.

An image of an object may be incident on an image plane IMG through the first, second, third, and fourth lenses L1, L2, L3, and L4. The image plane IMG may be a surface of an imaging device or a surface of an image sensor.

At least one optical filter P may be arranged between the fourth lens L4 and the image plane IMG or the image sensor. The optical filter P may include at least one of a low pass filter, an infrared (IR) cut-off filter, and a cover glass. When the optical filter P includes an IR cut-off filter, a visible ray may be transmitted and an infrared ray may be blocked, so that the infrared ray may not reach the image plane IMG. However, the photographic lens L may be configured without the optical filter P.

The first, second, third, and fourth lenses L1, L2, L3, and L4 may include at least one aspherical lens. For example, each of the first, second, third, and fourth lenses L1, L2, L3, and L4 may include at least one aspherical surface. For example, each of the first, second, third, and fourth lenses L1, L2, L3, and L4 may be a bi-aspherical lens which has two aspherical surfaces. By doing so, the photographic lens L may have compactness and high resolution.

At least one of the first, second, third, and fourth lenses L1, L2, L3, and L4 may be formed as a plastic lens. For example, each of the first, second, third, and fourth lenses L1, L2, L3, and L4 may be a plastic lens. By forming at least one of the first, second, third, and fourth lenses L1, L2, L3, and L4 by using a plastic material, manufacturing costs may be decreased and an aspherical surface may be easily manufactured.

The photographic lens L according to the present embodiment may satisfy Conditions 1 and 2 below:

$$-3 < RS6/RS8 < -1.3 \qquad \text{<Conditions 1>}$$

$$0.86 < IMH/EFL < 1.5 \qquad \text{<Conditions 2>}$$

where, RS6 is a radius of curvature of the image-side surface S6 of the third lens L3, RS8 is a radius of curvature of the image-side surface S8 of the fourth lens L4, IMH indicates a height of the image sensor, and EFL is an effective focal length of the photographic lens L. The height of the image sensor indicates a diagonal height.

Condition 1 indicates a ratio of a radius of curvature of the image-side surface S6 of the third lens L3 to a radius of curvature of the image-side surface S8 of the fourth lens L4. In this regard, light that is reflected from the image-side surface S6 of the third lens L3 to the object-side surface S5 of the third lens L3 may be reflected again from the object-side surface S5 to the image plane IMG (or the image sensor). Here, the light that is reflected again from the object-side surface S5 of the third lens L3 may be incident on a side edge of the image plane IMG (or the image sensor), such that a flare may occur. When (RS6/RS8) satisfies Condition 1, the amount of light that is reflected from the image-side surface S6 of the third lens L3 to the image plane IMG may be decreased so that the flare and color fringing may be reduced and thus high resolution may be achieved. When (IMH/EFL) satisfies Condition 2, a field of view may be increased.

The photographic lens L according to the present embodiment may satisfy Condition 3 below:

$$|RS5|/|RS6|>2 \qquad \text{<Condition 3>}$$

where, RS5 is a radius of curvature of the object-side surface S5 of the third lens L3 and RS6 is a radius of curvature of the image-side surface S6 of the third lens L3. When Condition 3 is satisfied, the amount of light that is reflected from the image-side surface S6 of the third lens L3 to the image plane IMG may be decreased so that the flare may be reduced.

The photographic lens L according to the present embodiment may satisfy Condition 4 below:

$$1<BFL/TL4<2.5 \qquad \text{<Condition 4>}$$

where, BFL is a back focal length and TL4 is a thickness of the fourth lens L4. The back focal length indicates a distance between the image-side surface S8 of the fourth lens L4 and the image plane IMG (or the image sensor).

The photographic lens L according to the present embodiment may satisfy Condition 5 below:

$$0<(TA2+TA3)/(TL3+TL4)<0.3 \qquad \text{<Condition 5>}$$

Here, TA2 is an air gap between the second lens L2 and the third lens L3, TA3 is an air gap between the third lens L3 and the fourth lens L4, TL3 indicates a thickness of the third lens L3, and TL4 indicates a thickness of the fourth lens L4. When Inequalities 4 and 5 are satisfied, a size of the photographic lens L may be reduced to be compact.

The photographic lens L according to the present embodiment may satisfy Condition 6 below:

$$0.5<FL1/EFL<1 \qquad \text{<Condition 6>}$$

where, FL1 is a focal length of the first lens L1 and EFL is an effective focal length of the photographic lens L. When Condition 6 is satisfied, aberration of the photographic lens L may be easily corrected.

The photographic lens L according to the present embodiment may satisfy Condition 7 below:

$$-0.1<EFL/FL12<1 \qquad \text{<Condition 7>}$$

where, EFL is the effective focal length of the photographic lens L and FL12 indicates an effective focal length of the first lens L1 and the second lens L2. When Condition 7 is satisfied, spherical aberration may be easily corrected.

The photographic lens L according to the present embodiment may satisfy Condition 8 below:

$$25<V1-V2 \qquad \text{<Condition 8>}$$

where, V1 is an Abbe number of the first lens L1 and V2 is an Abbe number of the second lens L2. When Condition 8 is satisfied, chromatic aberration may be easily corrected.

The photographic lens L according to the present embodiment may satisfy Condition 9 below:

$$RS7>RS8>0 \qquad \text{<Condition 9>}$$

where, RS7 is a radius of curvature of the object-side surface S7 of the fourth lens L4 and RS8 is a radius of curvature of the image-side surface S8 of the fourth lens L4.

In the present embodiment, an aspherical surface of the photographic lens L is defined as below.

When an X-axis is an optical axis direction and a Y-axis is a direction perpendicular to the optical axis direction, an aspherical shape may be expressed by Equation 10 below and a travel direction of light rays may be regarded as being positive. Here, x is a distance from the lens apex in the optical axis direction, y is a distance in the direction perpendicular to the optical axis direction, K is a conic constant, An is an aspherical coefficient, and C is the reciprocal of a radius of curvature (1/R) at the lens apex.

$$x = \frac{Cy^2}{1+\sqrt{1-(K+1)C^2y^2}} + \sum_{n=1}^{6} Any^{2(n+1)} \qquad \text{< Equation 10 >}$$

According to one or more embodiments, the photographic lens L may vary according to various design changes.

In various embodiments, lens-surface numbers S1, S2, S3, . . . Sn are serially numbered sequentially from the object-side O toward the image-side I. Here, EFL is the effective focal length of the photographic lens L, BFL is a back focal length, FoV is a field of view, R is a radius of curvature, Dn is a lens thickness or an air gap between lenses, Nd is a refractive index, and Vd is an Abbe number. ST is an aperture stop, and * indicates an aspherical surface.

First Embodiment

FIG. 1 illustrates the photographic lens L according to the first embodiment, and Table 1 shows design data of the first embodiment.

TABLE 1

| Lens surface | R | Dn | Nd | Vd |
|---|---|---|---|---|
| S1*(ST) | 1.443 | 0.475 | 1.545 | 56.1 |
| S2* | −1.339 | 0.030 | | |
| S3* | 16.227 | 0.200 | 1.640 | 23.2 |
| S4* | 1.366 | 0.157 | | |
| S5* | −1.844 | 0.448 | 1.545 | 56.1 |
| S6* | −0.766 | 0.030 | | |
| S7* | 0.755 | 0.332 | 1.545 | 56.1 |
| S8* | 0.459 | 0.228 | | |
| S9 | infinity | 0.110 | 1.517 | 64.2 |
| S10 | infinity | 0.292 | | |
| IMG | | 0.010 | | |

Table 2 below shows aspherical coefficients of the lens surfaces in the first embodiment.

TABLE 2

| Lens surface | R | K | A1 | A2 | A3 | A4 | A5 | A6 |
|---|---|---|---|---|---|---|---|---|
| S1*(ST) | 1.443 | 2.55E+00 | −6.52E−01 | 7.12E+00 | −9.16E+01 | 3.55E+02 | −4.00E−05 | 2.70E−08 |
| S2* | −1.339 | 3.69E+00 | −5.43E−03 | −2.42E+00 | 4.05E+01 | −1.33E+02 | −4.51E+00 | −2.90E−06 |
| S3* | 16.227 | 0.00E+00 | −5.05E−01 | −1.18E+00 | 2.46E+01 | −2.33E+01 | −1.74E+02 | 4.69E+01 |
| S4* | 1.366 | 3.20E−01 | 1.06E−01 | −2.59E+00 | 5.26E+00 | 2.82E+01 | −8.67E+01 | 3.04E+00 |
| S5* | −1.844 | 8.14E+00 | 1.83E+00 | −4.29E+00 | 6.31E+00 | 4.36E+01 | −1.94E+01 | 3.94E+01 |
| S6* | −0.766 | −1.19E+00 | −1.82E+00 | 3.30E+00 | −9.20E+00 | 1.19E+01 | 1.63E+00 | −7.54E+00 |
| S7* | 0.755 | −6.25E+00 | −9.47E−01 | 7.23E−01 | −3.58E−01 | −1.68E−01 | 8.61E−01 | −4.95E−01 |
| S8* | 0.459 | −2.89E+00 | −8.54E−01 | 1.43E+00 | −1.73E+00 | 1.25E+00 | −4.90E−01 | 6.87E−02 |

Figure 2:
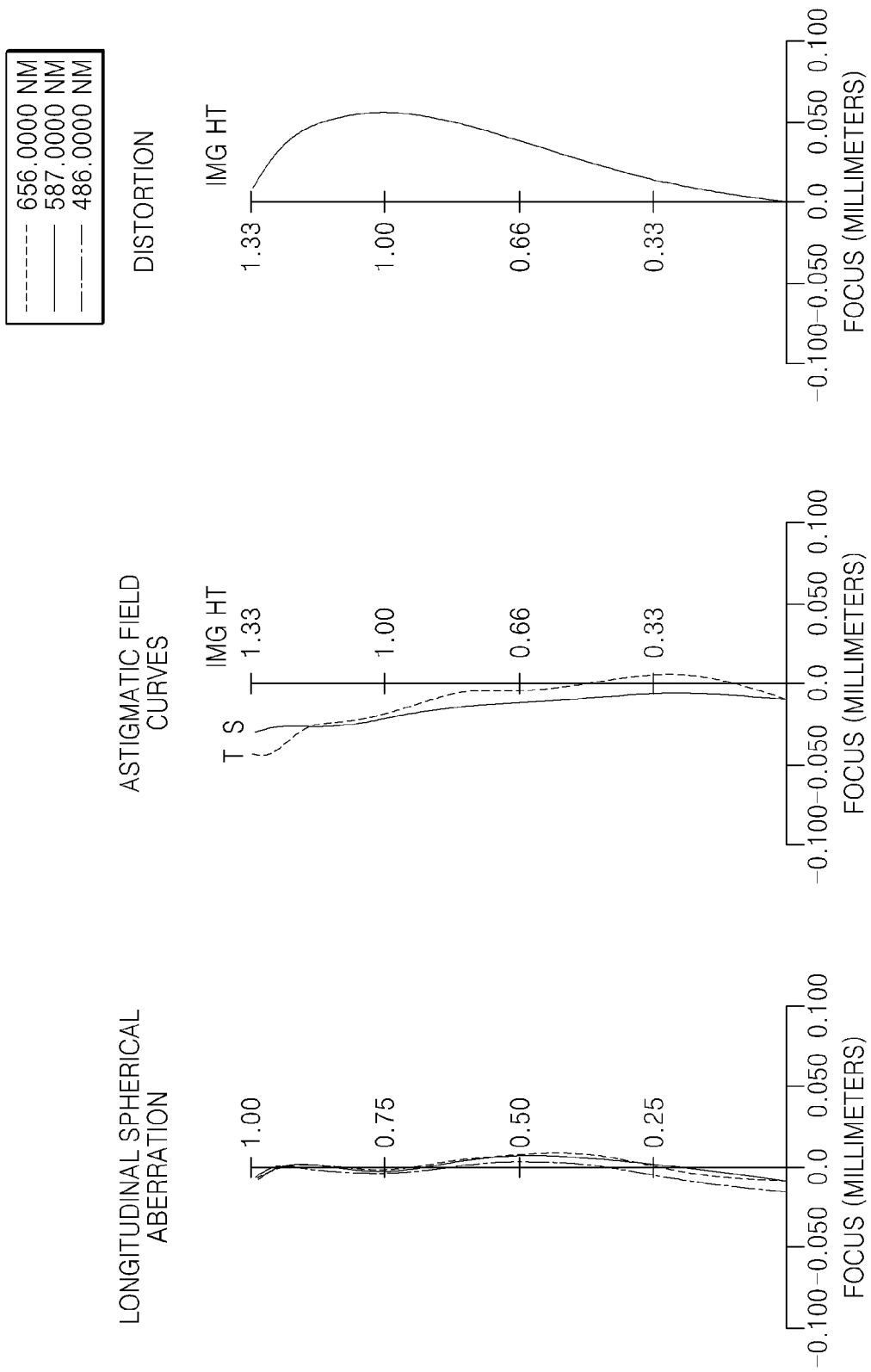
FIG. 2 illustrates longitudinal spherical aberration, astigmatic field curves, and distortion of the photographic lens according to the first embodiment.

FIG. 2 illustrates longitudinal spherical aberration, astigmatic field curves, and distortion of the photographic lens L according to the first embodiment. The tangential field curvature T and sagittal field curvature S are shown as the astigmatic field curves.

Second Embodiment

Figure 3:
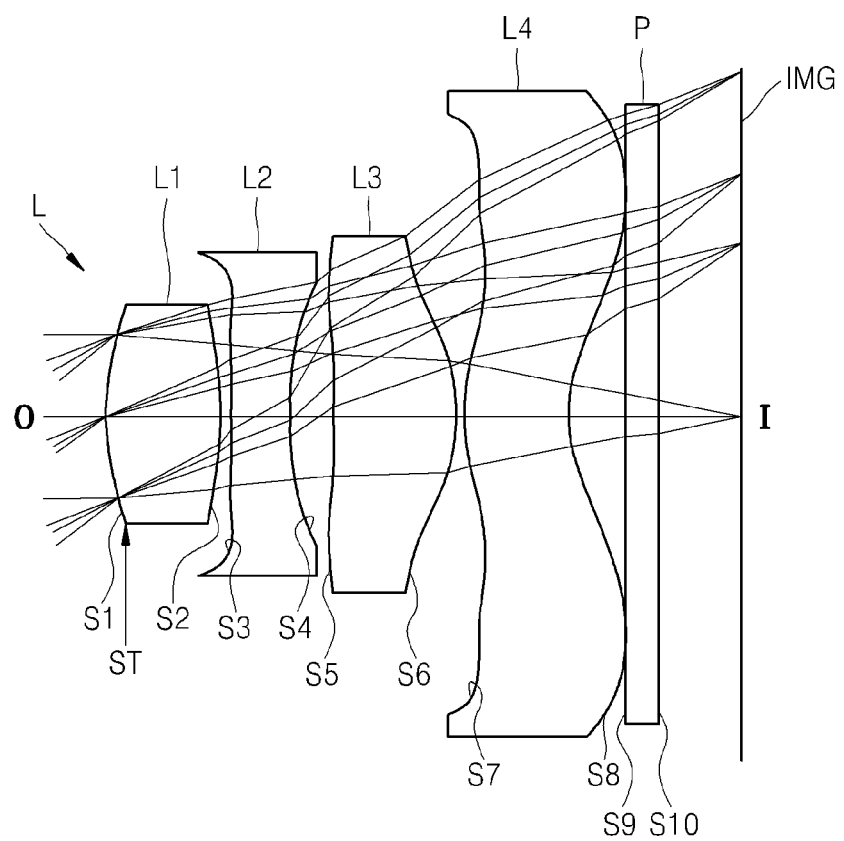
FIG. 3 illustrates a photographic lens, according to a second embodiment.

FIG. 3 illustrates a photographic lens L according to a second embodiment, and Table 3 shows design data of the second embodiment.

TABLE 3

| Lens surface | R | Dn | Nd | Vd |
|---|---|---|---|---|
| S1*(ST) | 1.130 | 0.383 | 1.545 | 56.1 |
| S2* | −1.638 | 0.030 | | |

TABLE 3-continued

| Lens surface | R | Dn | Nd | Vd |
|---|---|---|---|---|
| S3* | −10000.000 | 0.200 | 1.640 | 23.2 |
| S4* | 1.291 | 0.150 | | |
| S5* | −1.910 | 0.412 | 1.545 | 56.1 |
| S6* | −0.692 | 0.030 | | |
| S7* | 0.778 | 0.340 | 1.545 | 56.1 |
| S8* | 0.452 | 0.203 | | |
| S9 | infinity | 0.110 | 1.517 | 64.2 |
| S10 | infinity | 0.270 | | |
| IMG | | 0.000 | | |

Table 4 below shows aspherical coefficients of the lens surfaces in the second embodiment.

TABLE 4

| Lens surface | R | K | A1 | A2 | A3 | A4 | A5 | A6 |
|---|---|---|---|---|---|---|---|---|
| S1*(ST) | 1.13E+00 | 1.87E+00 | −7.91E−01 | 1.01E+01 | −1.39E+02 | 6.13E+02 | −4.00E−05 | 2.70E−08 |
| S2* | −1.64E+00 | 2.44E+00 | 1.44E−01 | −2.85E+00 | 4.04E+01 | −1.40E+02 | −4.51E+00 | −2.90E−06 |
| S3* | −10000.000 | 0.00E+00 | −3.79E−01 | −4.26E−01 | 2.48E+01 | −2.01E+01 | −1.91E+02 | 3.60E−06 |
| S4* | 1.29E+00 | 4.29E−01 | 1.23E−01 | −2.71E+00 | 5.35E+00 | 3.01E+01 | −8.48E+01 | 5.86E−01 |
| S5* | −1.91E+00 | 9.05E+00 | 2.01E+00 | −4.68E+00 | 6.47E+00 | 5.46E+00 | −2.36E+01 | −4.55E+00 |
| S6* | −6.92E−01 | −1.34E+00 | −6.61E−02 | 3.81E+00 | −8.88E+00 | 1.13E+01 | −3.22E−01 | −1.13E+01 |
| S7* | 7.78E−01 | −9.68E+00 | −7.48E−01 | 7.74E−01 | −3.84E−01 | −1.17E−01 | 7.92E−01 | −5.38E−01 |
| S8* | 4.52E−01 | −3.62E+00 | −7.50E−01 | 1.27E+00 | −1.63E+00 | 1.22E+00 | −5.02E−01 | 8.88E−02 |

Figure 4:
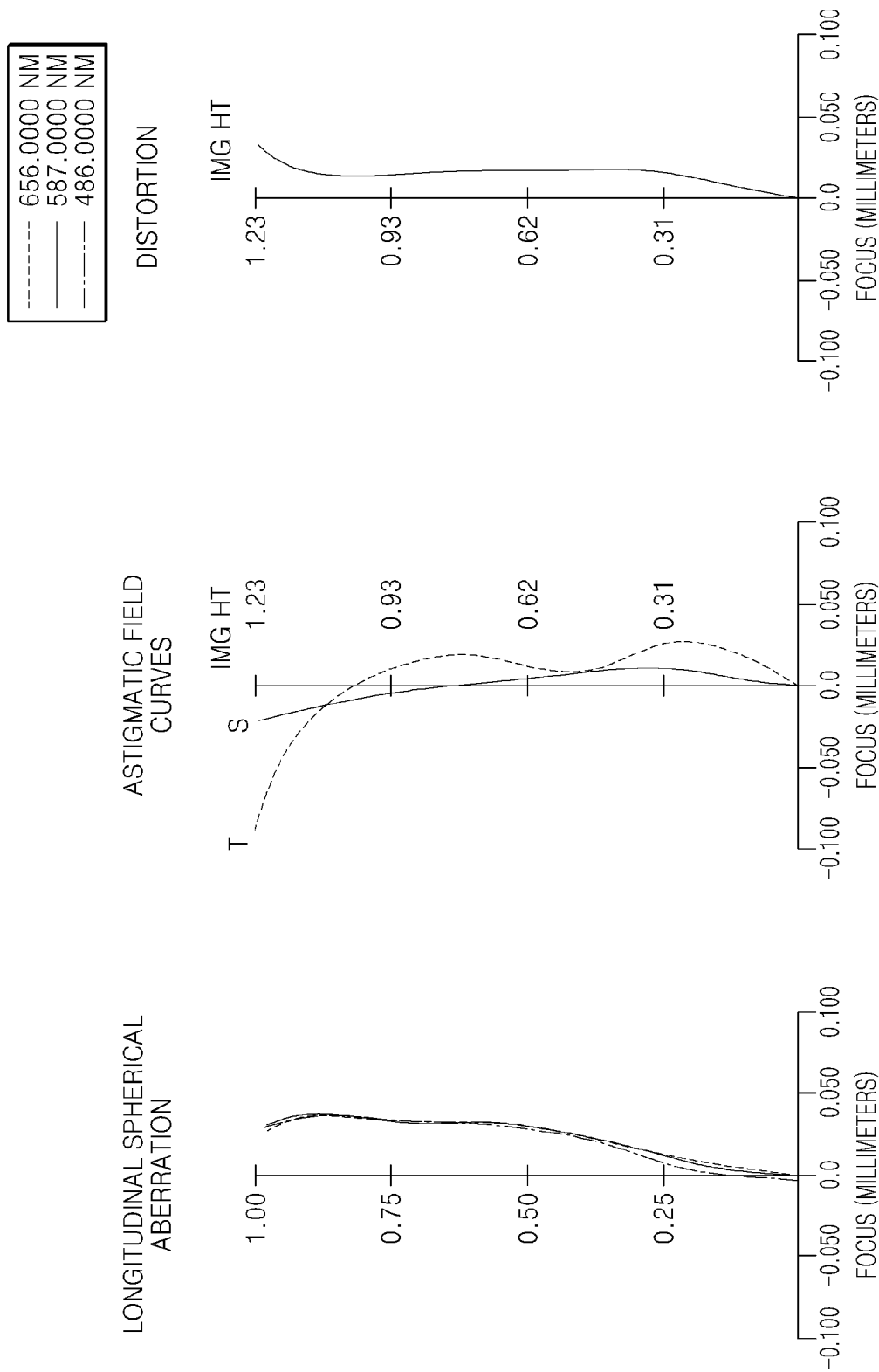
FIG. 4 illustrates longitudinal spherical aberration, astigmatic field curves, and distortion of the photographic lens according to the second embodiment.

FIG. 4 illustrates longitudinal spherical aberration, astigmatic field curves, and distortion of the photographic lens L according to the second embodiment.

Third Embodiment

Figure 5:
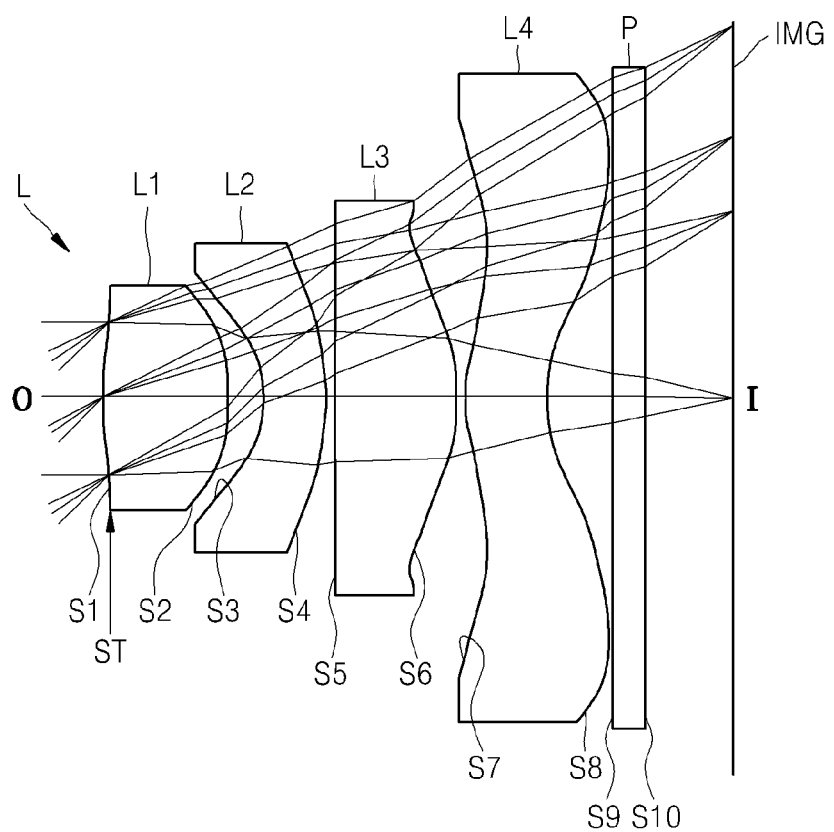
FIG. 5 illustrates a photographic lens, according to a third embodiment.

FIG. 5 illustrates a photographic lens L according to a third embodiment, and Table 5 shows design data of the third embodiment.

TABLE 5

| Lens surface | R | Dn | Nd | Vd |
|---|---|---|---|---|
| S1*(ST) | 1.444 | 0.415 | 1.545 | 56.1 |
| S2* | −0.652 | 0.120 | | |
| S3* | −0.339 | 0.200 | 1.636 | 23.9 |
| S4* | −1.019 | 0.030 | | |
| S5* | 16.567 | 0.410 | 1.545 | 56.1 |
| S6* | −0.574 | 0.030 | | |
| S7* | 0.792 | 0.270 | 1.55 | 51.6 |
| S8* | 0.418 | 0.217 | | |
| S9 | infinity | 0.110 | 1.517 | 64.2 |
| S10 | infinity | 0.288 | | |
| IMG | | 0 | | |

Table 6 below shows aspherical coefficients of the lens surfaces in the third embodiment.

TABLE 6

| Lens surface | R | K | A1 | A2 | A3 | A4 | A5 | A6 |
|---|---|---|---|---|---|---|---|---|
| S1*(ST) | 1.444 | -2.22E+00 | -9.88E-01 | 1.41E+01 | -2.23E+02 | 1.58E+02 | -5.29E+00 | -8.78E+01 |
| S2* | -0.652 | -5.09E+00 | -3.94E+00 | 1.57E+00 | 9.91E+01 | -5.94E+02 | 4.88E+02 | -3.57E+01 |
| S3* | -0.339 | -8.05E-01 | -1.30E+00 | 1.58E+01 | 3.65E+01 | 2.46E+01 | -3.98E+03 | 1.60E+04 |
| S4* | -1.019 | 0.00E+00 | -6.88E-01 | 4.67E+00 | -3.36E+00 | -2.33E+01 | -4.07E+01 | 3.24E+02 |
| S5* | 16.567 | -2.38E+02 | -6.20E-03 | 2.87E-02 | 8.39E-02 | -1.88E-01 | -1.44E+00 | -3.55E+00 |
| S6* | -0.574 | -3.79E+01 | -4.31E-01 | 4.80E+00 | -1.18E+01 | 1.08E+01 | 2.66E+01 | -4.75E+01 |
| S7* | 0.792 | -1.01E+01 | -3.45E-01 | -1.57E+00 | 5.35E+00 | -1.02E+01 | 1.16E+01 | -5.30E+00 |
| S8* | 0.418 | -3.93E+00 | -5.31E-01 | 4.11E-01 | -1.22E-01 | -1.85E-01 | 1.33E-01 | -1.70E-02 |

Figure 6:
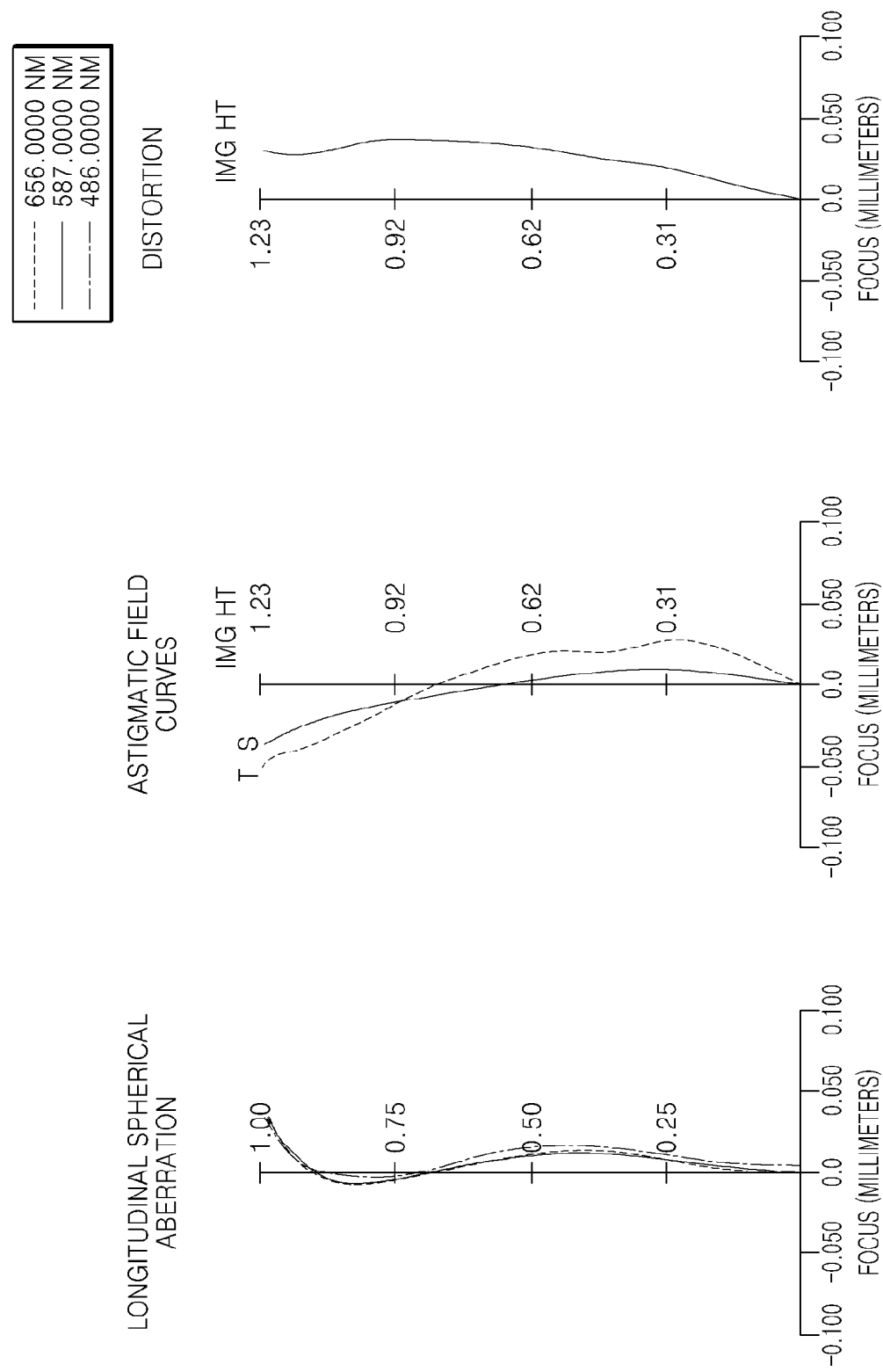
FIG. 6 illustrates longitudinal spherical aberration, astigmatic field curves, and distortion of the photographic lens according to the third embodiment.

FIG. 6 illustrates longitudinal spherical aberration, astigmatic field curves, and distortion of the photographic lens L according to the third embodiment.

Fourth Embodiment

Figure 7:
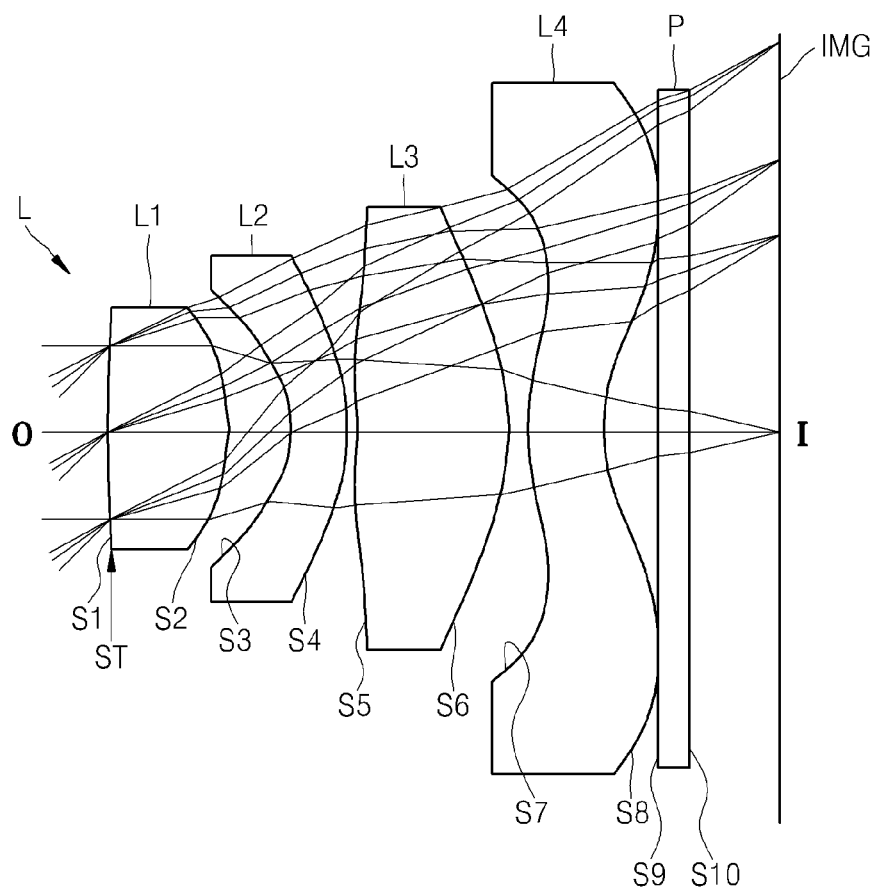
FIG. 7 illustrates a photographic lens, according to a fourth embodiment.

FIG. 7 illustrates a photographic lens L according to a fourth embodiment, and Table 7 shows design data of the fourth embodiment.

TABLE 7

| Lens surface | R | Dn | Nd | Vd |
|---|---|---|---|---|
| S1*(ST) | 2.274 | 0.402 | 1.545 | 56.1 |
| S2* | -0.790 | 0.216 | | |

TABLE 7-continued

| Lens surface | R | Dn | Nd | Vd |
|---|---|---|---|---|
| S3* | -0.331 | 0.190 | 1.636 | 23.9 |
| S4* | -0.614 | 0.030 | | |
| S5 | 7.030 | 0.509 | 1.545 | 56.1 |
| S6* | -0.771 | 0.067 | | |
| S7* | 0.788 | 0.250 | 1.55 | 51.6 |
| s8* | 0.452 | 0.189 | | |
| S9 | infinity | 0.110 | 1.517 | 64.2 |
| S10 | infinity | 0.301 | | |
| IMG | | 0 | | |

Table 8 below shows aspherical coefficients of the lens surfaces in the fourth embodiment.

TABLE 8

| Lens surface | R | K | A1 | A2 | A3 | A4 | A5 | A6 |
|---|---|---|---|---|---|---|---|---|
| S1*(ST) | 2.274 | -3.16E+01 | -1.03E+00 | 1.82E+01 | -3.44E+02 | 1.62E+03 | -5.29E+00 | -8.78E+01 |
| S2* | -0.790 | -2.89E+00 | -2.07E+00 | 3.80E+00 | -2.45E+01 | -1.11E+02 | 4.88E+02 | -3.57E+01 |
| S3* | -0.331 | -9.66E-01 | -1.68E-01 | 9.44E+00 | 2.00E+01 | -4.69E+01 | -3.98E+03 | 1.60E+04 |
| S4* | -0.614 | -2.42E+00 | -7.06E-01 | 5.17E+00 | 2.47E+01 | -3.50E+01 | -1.59E+02 | 4.84E+02 |
| S6* | -0.771 | -7.33E+00 | -1.01E+00 | 4.37E+00 | -1.06E+01 | 7.24E+00 | 1.44E+01 | -1.58E+01 |
| S7* | 0.788 | -4.00E+00 | -1.15E+00 | 8.14E-01 | 1.12E+00 | -1.16E+01 | 2.07E+01 | -1.15E+01 |
| S8* | 0.452 | -3.19E+00 | -7.55E-01 | 8.34E-01 | -9.26E-01 | 6.49E-01 | -2.14E-01 | 1.74E-02 |

Figure 8:
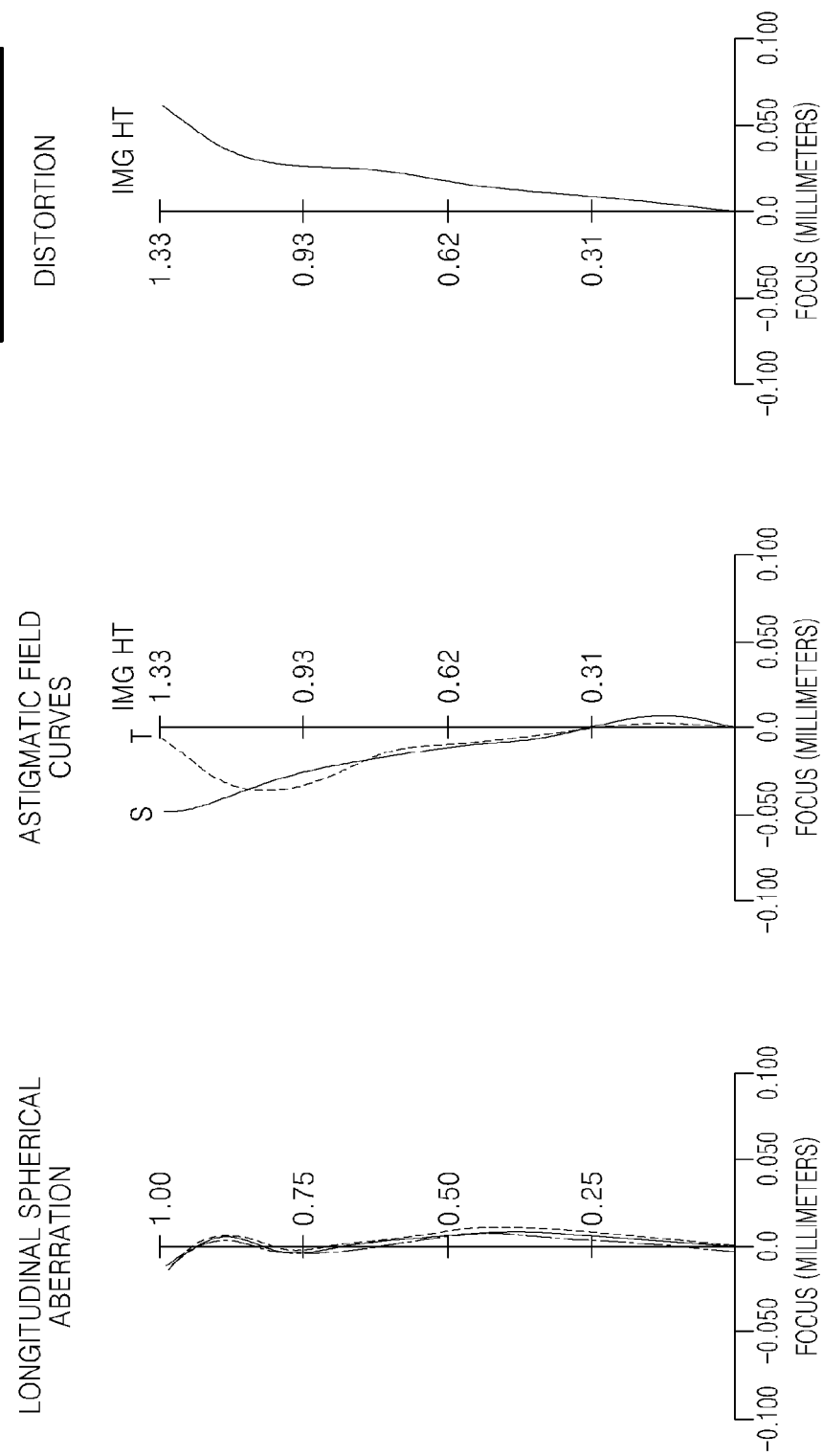
FIG. 8 illustrates longitudinal spherical aberration, astigmatic field curves, and distortion of the photographic lens according to the fourth embodiment.

FIG. 8 illustrates longitudinal spherical aberration, astigmatic field curves, and distortion of the photographic lens L according to the fourth embodiment.

Fifth Embodiment

Figure 9:
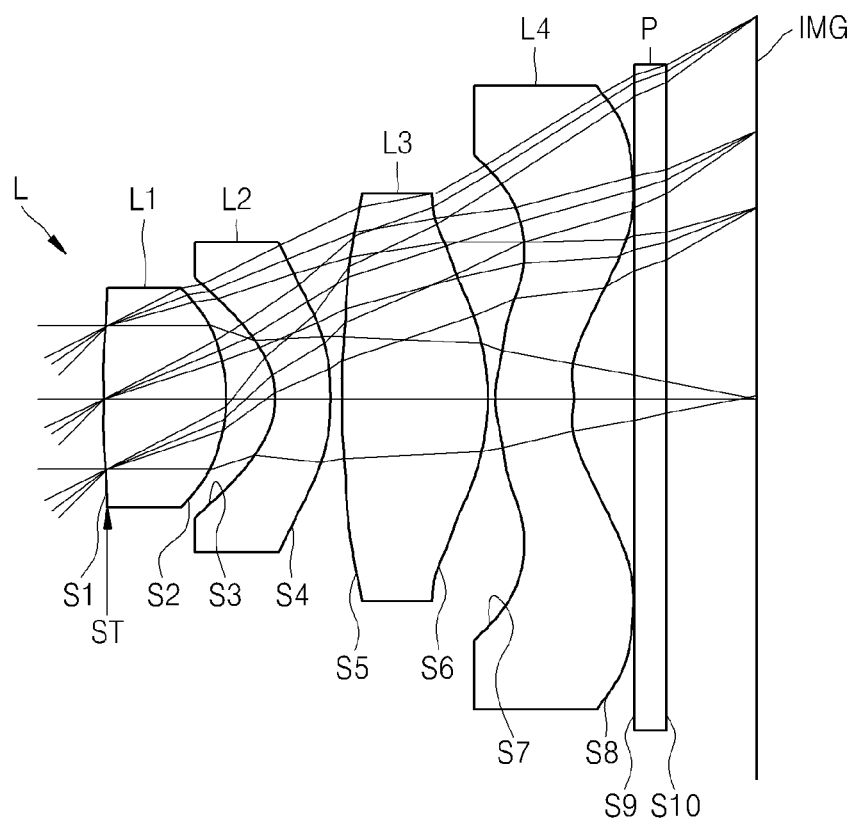
FIG. 9 illustrates a photographic lens, according to a fifth embodiment.

FIG. 9 illustrates a photographic lens L according to a fifth embodiment, and Table 9 shows design data of the fifth embodiment.

TABLE 9

| Lens surface | R | Dn | Nd | Vd |
|---|---|---|---|---|
| S1*(ST) | 1.907 | 0.409 | 1.545 | 56.1 |
| S2* | -0.725 | 0.166 | | |
| S3* | -0.307 | 0.190 | 1.636 | 23.9 |
| S4* | -0.645 | 0.030 | | |
| S5 | 3.615 | 0.489 | 1.545 | 56.1 |
| S6* | -0.804 | 0.030 | | |
| S7* | 0.737 | 0.250 | 1.55 | 51.6 |
| S8* | 0.490 | 0.211 | | |
| S9 | infinity | 0.110 | 1.517 | 64.2 |
| S10 | infinity | 0.301 | | |
| IMG | | 0 | | |

Table 10 below shows aspherical coefficients of the lens surfaces in the fifth embodiment.

TABLE 10

| Lens surface | R | K | A1 | A2 | A3 | A4 | A5 | A6 |
|---|---|---|---|---|---|---|---|---|
| S1*(ST) | 1.907 | −1.33E+01 | −9.00E−01 | 1.24E+01 | −2.94E+02 | 1.55E+03 | −5.23E+00 | −8.78E+01 |
| S2* | −0.725 | −2.45E+00 | −2.43E+00 | 5.17E−01 | −1.19E+01 | −7.21E+01 | 4.88E+02 | −3.65E+01 |
| S3* | −0.307 | −9.36E−01 | −2.78E−01 | 7.65E+00 | 9.74E+00 | 1.60E+02 | −3.98E+03 | 1.60E+04 |
| S4* | −0.645 | −3.42E+00 | −8.80E−01 | 4.25E+00 | 2.86E+00 | −2.28E+01 | −1.48E+02 | 4.42E+02 |
| S6* | −0.804 | −6.51E+00 | −8.37E−01 | 4.46E+00 | −1.06E+01 | 7.35E+00 | 1.47E+01 | −1.71E+01 |
| S7* | 0.737 | −2.24E+00 | −9.65E−01 | 1.39E+00 | 1.39E+00 | −9.92E+00 | 1.91E+01 | −1.10E+01 |
| S8* | 0.490 | −2.15E+00 | −8.65E−01 | 8.20E−01 | −8.13E−01 | 5.97E−01 | −1.76E−01 | −1.27E−02 |

Figure 10:
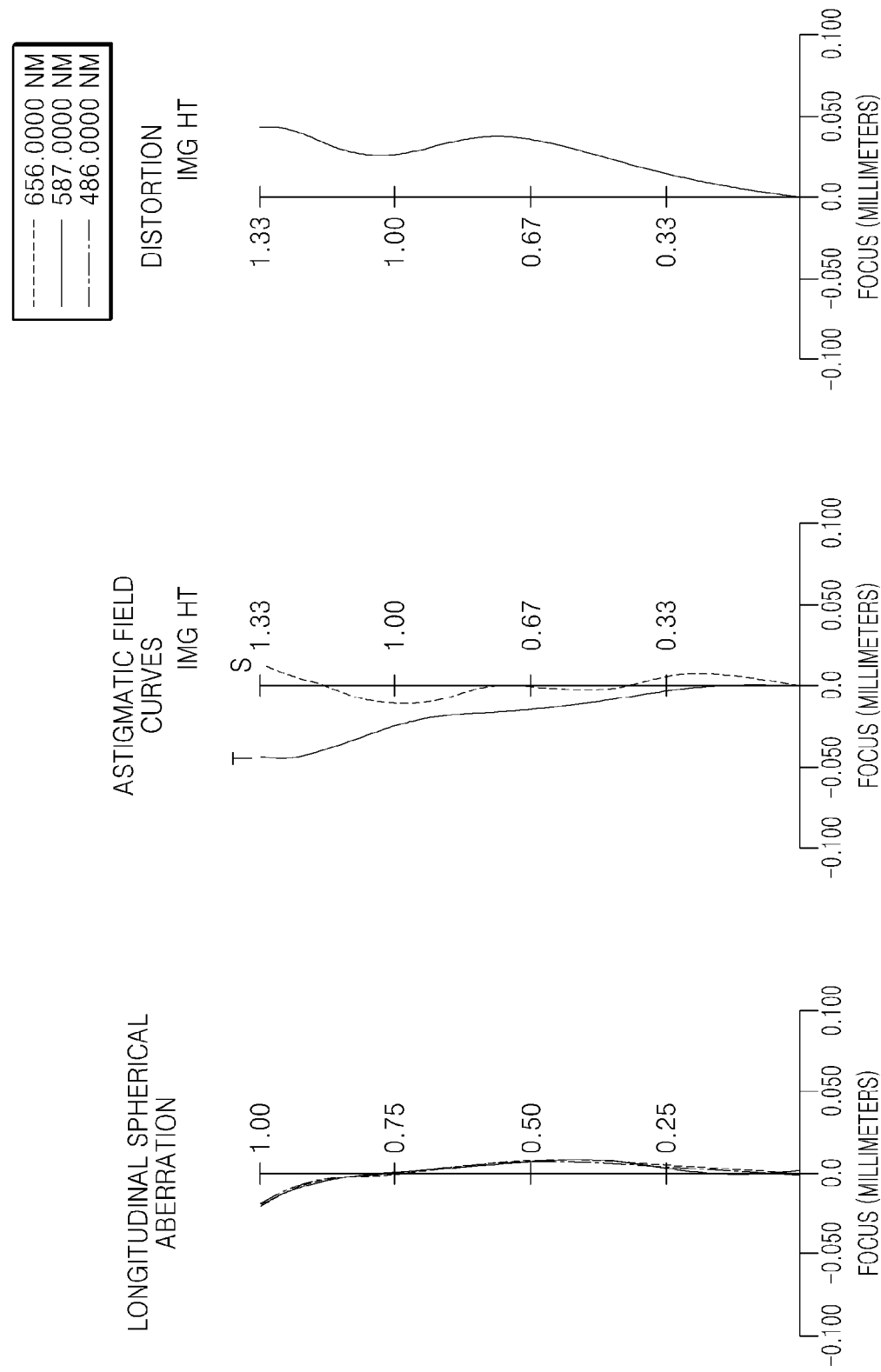
FIG. 10 illustrates longitudinal spherical aberration, astigmatic field curves, and distortion of the photographic lens according to the fifth embodiment.

FIG. 10 illustrates longitudinal spherical aberration, astigmatic field curves, and distortion of the photographic lens L according to the fifth embodiment.

The photographic lens L according to the one or more embodiments includes four lenses, each having an appropriate refractive power, so that aberration may be reduced and a total length of the photographic lens may be shortened, and thus, a compact optical system may be realized. Also, since a flare is reduced so that a high resolution image may be obtained, a wide angle of view may be realized. For example, the photographic lens L according to the one or more embodiments may have an angle of view equal to or greater than 80 degrees.

Table 11 below shows various data of the photographic lenses L according to the first through fifth embodiments.

TABLE 11

| Data | First embodiment | Second embodiment | Third embodiment | Fourth embodiment | Fifth embodiment |
|---|---|---|---|---|---|
| FoV | 81.5 | 80.2 | 88.6 | 84.0 | 93.3 |
| EFL | 1.53 | 1.44 | 1.24 | 1.33 | 1.23 |
| IMH | 1.33 | 1.23 | 1.23 | 1.23 | 1.23 |

Table 12 below shows that the photographic lenses L according to the first through fifth embodiments satisfy Conditions 1 through 9.

TABLE 11

| Condition | | First embodiment | Second embodiment | Third embodiment | Fourth embodiment | Fifth embodiment |
|---|---|---|---|---|---|---|
| 1 | −3 < RS6/RS8 < −1.3 | −1.67 | −1.53 | −1.37 | −1.70 | −1.64 |
| 2 | 1.5 > IMH/EFL > 0.85 | 0.88 | 0.86 | 0.99 | 0.93 | 1.08 |
| 3 | |RS5|/|RS6| > 2; | 2.41 | 2.76 | 28.85 | 9.12 | 4.50 |
| 4 | 1 < BFL/TL4 < 2.5; | 1.92 | 1.72 | 2.28 | 2.40 | 2.49 |
| 5 | 0 < (TA2 + TA3)/(TL3 + TL4) < 0.30 | 0.24 | 0.24 | 0.09 | 0.13 | 0.08 |
| 6 | 0.5 < FL1/EFL < 1 | 0.89 | 0.90 | 0.71 | 0.85 | 0.83 |
| 7 | −0.1 < EFL/FL12 < 1 | 0.63 | 0.57 | 0.24 | 0.39 | 0.27 |
| 8 | V 1− V 2 > 25 | 32.87 | 32.87 | 32.16 | 32.16 | 32.16 |
| 9 | RS7 > RS8 > 0 | TRUE | TRUE | TRUE | TRUE | TRUE |

The photographic lens L according to the one or more embodiments may be applied to an electronic apparatus having an image sensor mounted therein. The photographic lens L according to the one or more embodiments may also be applied to various electronic apparatuses such as digital cameras, interchangeable lens cameras, video cameras, cameras of mobile phones, cameras of small mobile devices, or the like.

Figure 11:
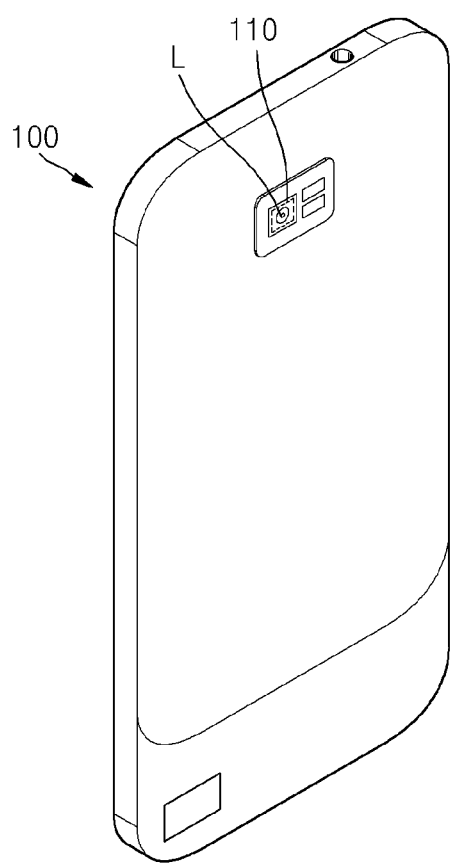
FIG. 11 illustrates an electronic apparatus including the photographic lens, according to an embodiment.

FIG. 11 illustrates an electronic apparatus 100 having the photographic lens L, according to an embodiment. In the embodiment of FIG. 11, the photographing apparatus 100 is applied to a mobile phone, but the embodiments of the invention are not limited thereto. The photographing apparatus 100 includes the photographic lens L and an image sensor 110 that receives an image formed by the photographic lens L and converts the image into an electrical image signal. The photographic lenses that are described above with reference to FIGS. 1 through 10 may be used as the photographic lens L. By applying the photographic lens according to the one or more embodiments to an electronic apparatus such as a digital camera, a mobile phone, etc., the photographing apparatus may perform an image-capturing operation with a wide-angle and high performance.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A photographic lens comprising:
   a first lens that has a positive refractive power and comprises a biconvex lens;
   a second lens that has a negative refractive power;
   a third lens that has a positive refractive power;
   a fourth lens that has a negative refractive power; and
   an image sensor,
   wherein the second lens is a meniscus lens having a concave surface toward the image-side, and
   wherein the first, second, third, and fourth lenses are arranged sequentially from an object-side to an image-side, and the photographic lens satisfies the following conditions:

$-3 < RS6/RS8 < -1.3$, $0.85 < IMH/EFL < 1.5$, wherein, RS6 is a radius of curvature of an image-side surface of the third lens, RS8 is a radius of curvature of an image-side surface of the fourth lens, IMH indicates a height of the image sensor, and EFL is an effective focal length of the photographic lens.

2. The photographic lens of claim 1, wherein the photographic lens further satisfies the following condition:

$|RS5|/|RS6| > 2$, wherein RS5 is a radius of curvature of an object-side surface of the third lens.

3. The photographic lens of claim 1, wherein the photographic lens further satisfies the following condition:

$1 < BFL/TL4 < 2.5$, wherein BFL is a back focal length of the photographic lens and TL4 is a thickness of the fourth lens.

4. The photographic lens of claim 1, wherein the photographic lens further satisfies the following condition:

$0 < (TA2+TA3)/(TL3+TL4) < 0.3$ wherein, TA2 is an air gap between the second lens and the third lens, TA3 is an air gap between the third lens and the fourth lens, TL3 indicates a thickness of the third lens, and TL4 indicates a thickness of the fourth lens.

5. The photographic lens of claim 1, wherein an aperture stop is further arranged at an object-side surface of the first lens.

6. The photographic lens of claim 1, wherein each of the first through fourth lenses has at least one aspherical surface.

7. The photographic lens of claim 6, wherein each of the first through fourth lenses has two aspherical surfaces.

8. The photographic lens of claim 1, wherein the second lens has at least one concave surface.

9. The photographic lens of claim 1, wherein each of the first through fourth lenses is a plastic lens.

10. The photographic lens of claim 1, wherein the image-side surface of the fourth lens has at least one inflection point.

11. The photographic lens of claim 10, wherein an object-side surface of the fourth lens has at least one inflection point.

12. The photographic lens of claim 1, wherein the photographic lens further satisfies the following condition:

$0.5 < FL1/EFL < 1$, wherein FL1 is a focal length of the first lens.

13. The photographic lens of claim 1, wherein the photographic lens further satisfies the following condition:

$-0.1 < EFL/FL12 < 1$, wherein FL12 indicates an effective focal length of the first lens and the second lens.

14. The photographic lens of claim 1, wherein the photographic lens further satisfies the following condition:

$25 < V1-V2$, wherein V1 is an Abbe number of the first lens and V2 is an Abbe number of the second lens.

15. The photographic lens of claim 1, wherein the photographic lens further satisfies the following condition:

$RS7 > RS8 > 0$, wherein RS7 is a radius of curvature of an object-side surface of the fourth lens.

16. The photographic lens of claim 1, wherein the photographic lens has an angle of view equal to or greater than 80 degrees.

17. An electronic apparatus comprising the photographic lens of claim 1.

18. A photographic lens comprising:
    a first lens having a positive refractive power;
    a second lens having a negative refractive power;
    a third lens having a positive refractive power; and
    a fourth lens having a negative refractive power, and
    wherein the second lens is a meniscus lens having a concave surface toward the image-side, and
    wherein the first, second, third, and fourth lenses are arranged sequentially from an object-side to an image-side, and the photographic lens satisfies the following conditions:

$|RS5|/|RS6| > 2$, $1 < BFL/TL4 < 2.5$, $0 < (TA2+TA3)/(TL3+TL4) < 0.3$, wherein, RS5 is a radius of curvature of an object-side surface of the third lens, RS6 is a radius of curvature of an image-side surface of the third lens, BFL is a back focal length of the photographic lens, TA2 is an air gap between the second lens and the third lens, TA3 is an air gap between the third lens and the fourth lens, TL3 indicates a thickness of the third lens, and TL4 indicates a thickness of the fourth lens, and wherein the photographic lens has an angle of view equal to or greater than 80 degrees.

19. The photographic lens of claim 18, wherein an aperture stop is further arranged at an object-side surface of the first lens.

20. The photographic lens of claim 18, wherein the photographic lens satisfies the following condition:

$0.5<FL1/EFL<1$, wherein FL1 is a focal length of the first lens and EFL is an effective focal length of the photographic lens.

21. The photographic lens of claim 18, wherein the photographic lens satisfies the following condition:

$-0.1<EFL/FL12<1$, wherein EFL is an effective focal length of the photographic lens and FL12 indicates an effective focal length of the first lens and the second lens.

22. A photographic lens comprising:
a first lens having a positive refractive power;
a second lens having a negative refractive power;
a third lens having a positive refractive power; and
a fourth lens having a negative refractive power, and
wherein the first, second, third, and fourth lenses are arranged sequentially from an object-side to an image-side, and the photographic lens satisfies the following conditions:

$|RS5|/|RS6|>2$, $1<BFL/TL4<2.5$, $0<(TA2+TA3)/(TL3+TL4)<0.3$, $RS7>RS8>0$, wherein RS5 is a radius of curvature of an object-side surface of the third lens, RS6 is a radius of curvature of an image-side surface of the third lens, BFL is a back focal length of the photographic lens, TA2 is an air gap between the second lens and the third lens, TA3 is an air gap between the third lens and the fourth lens, TL3 indicates a thickness of the third lens, and TL4 indicates a thickness of the fourth lens, RS7 is a radius of curvature of an object-side surface of the fourth lens and RS8 is a radius of curvature of an image-side surface of the fourth lens, and wherein the photographic lens has an angle of view equal to or greater than 80 degrees.

* * * * *